US012068119B2

(12) United States Patent
Chen et al.

(10) Patent No.: US 12,068,119 B2
(45) **Date of Patent: *Aug. 20, 2024**

(54) KEYBOARD DEVICE WITH DISPLAY PANEL

(71) Applicant: Acer Incorporated, New Taipei (TW)

(72) Inventors: Hung-Chi Chen, New Taipei (TW); Kung-Cheng Lin, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,786

(22) Filed: Oct. 24, 2023

(65) Prior Publication Data

US 2024/0055199 A1 Feb. 15, 2024

Related U.S. Application Data

(63) Continuation of application No. 18/155,738, filed on Jan. 18, 2023, now Pat. No. 11,842,862, which is a continuation of application No. 17/667,476, filed on Feb. 8, 2022, now Pat. No. 11,587,744.

(30) Foreign Application Priority Data

May 31, 2021 (TW) ................................ 110119699

(51) Int. Cl.
*H01H 13/83* (2006.01)
*H01H 13/7065* (2006.01)

(52) U.S. Cl.
CPC ........ *H01H 13/7065* (2013.01); *H01H 13/83* (2013.01); *H01H 2221/044* (2013.01)

(58) Field of Classification Search
CPC ............. H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037
See application file for complete search history.

(56) References Cited

U.S. PATENT DOCUMENTS

| | | | | |
|---|---|---|---|---|
| 10,592,004 | B1 * | 3/2020 | Sun | H01H 13/83 |
| 11,289,287 | B2 * | 3/2022 | Lin | G06F 1/1662 |
| 11,842,862 | B2 * | 12/2023 | Chen | H01H 13/7065 |
| 2018/0294113 | A1 * | 10/2018 | Mahajan | H01H 13/88 |
| 2021/0249204 | A1 * | 8/2021 | Huang | G06F 3/0202 |

* cited by examiner

*Primary Examiner* — Ahmed M Saeed
(74) *Attorney, Agent, or Firm* — JCIPRNET

(57) ABSTRACT

A keyboard device with a display panel including a base, a scissors feet assembly movably disposed on the base, an elastic member disposed on the base, a display panel supported by the scissors feet assembly and the elastic member, and multiple light transmittance keycaps disposed on the display panel is provided. The display panel has multiple display surfaces, multiple hollow portions, and multiple elastic portions. Each of the display surfaces is surrounded by the hollow portions, and is suspended between the hollow portions by the elastic portions. The light transmittance keycaps respectively and correspondingly cover the display surfaces.

12 Claims, 5 Drawing Sheets

KEYBOARD DEVICE WITH DISPLAY PANEL

CROSS-REFERENCE TO RELATED APPLICATION

This is a continuation application of and claims the priority benefit of U.S. application Ser. No. 18/155,738, filed on Jan. 18, 2023, which claims the priority benefit of U.S. application Ser. No. 17/667,476, filed on Feb. 8, 2022, which claims the priority benefit of Taiwan application serial no. 110119699, filed on May 31, 2021. The entirety of each of the above-mentioned patent applications is hereby incorporated by reference herein and made a part of this specification.

BACKGROUND

Technical Field

The disclosure relates to a keyboard device, and more particularly, to a keyboard device with a display panel.

Description of Related Art

In the conventional technology, the keyboard has multiple keys, and at least one text or pattern is printed on the keycap of each key to endow the key with a specific input function and allow the user to identify the input function thereof. However, the text or pattern on each keycap is set before the product leaves the factory and cannot be defined by the user himself. Although some keyboards are equipped with additional macro keys to allow the user to switch the input commands corresponding to the key bodies by himself, the images thereon cannot be changed accordingly, so the user cannot know the input commands corresponding to the current key bodies at once.

Furthermore, although the existing luminous keyboard can emit light when in use or when required by the user, similar to the above, the luminous effect thereof is also set before the product leaves the factory and cannot be adjusted according to user requirements.

Accordingly, how to improve the visual limitation of the keyboard or keys regarding the text or pattern thereof and enable the keyboard or keys to be freely defined by the user as required has become a topic for people skilled in the art to ponder and solve.

SUMMARY

The disclosure provides a keyboard device with a display panel, which provides both a definable identification text or pattern while providing a stable pressing sensation for a user.

The keyboard device with the display panel of the disclosure includes a base, a scissors feet assembly, an elastic member, a display panel, and multiple light transmittance keycaps. The scissors feet assembly is movably disposed on the base. The elastic member is disposed on the base. The display panel is supported on the scissors feet assembly and the elastic member. The display panel has multiple hollow portions, multiple elastic portions, and multiple display surfaces. Each of the display surfaces is surrounded by the hollow portions, and each of the display surfaces is suspended between the hollow portions by the elastic portions. The light transmittance keycaps are disposed on the display panel, and respectively and correspondingly cover the display surfaces.

Based on the above, the keyboard device with the display panel of the disclosure is provided with the display panel with the display surfaces, and the display panel is formed with the hollow portions, the elastic portions, and the display surfaces on a structure thereof. Each of the display surfaces is surrounded by the hollow portions, and each of the display surfaces is suspended between the hollow portions by the elastic portions. The light transmittance keycaps are respectively disposed on the display panel to cover the corresponding display surfaces. In this way, an image generated by the display panel is transmitted upwards and projected out of the keyboard through the light transmittance keycap to provide the user with the required and easily recognized text or pattern. Since the display panel is clamped between the light transmittance keycaps, the scissors feet assembly, and the elastic member, the generated image may be projected out of the keyboard device through the light transmittance keycap without obstacles.

At the same time, as mentioned above, each of the display surfaces is suspended between the hollow portions by the elastic portions. Therefore, when the light transmittance keycap of the keyboard device is pressed, the elastic portion is also driven to elastically deform. That is, in addition to the elastic member, the elastic portion of the display panel may further provide functions other than display, so as to combine the elastic member to provide the required support and reset effect for the display panel and the light transmittance keycaps thereon, thereby enhancing the pressing sensation when the user presses the keyboard device.

DETAILED DESCRIPTION OF DISCLOSED EMBODIMENTS

Figure 1:
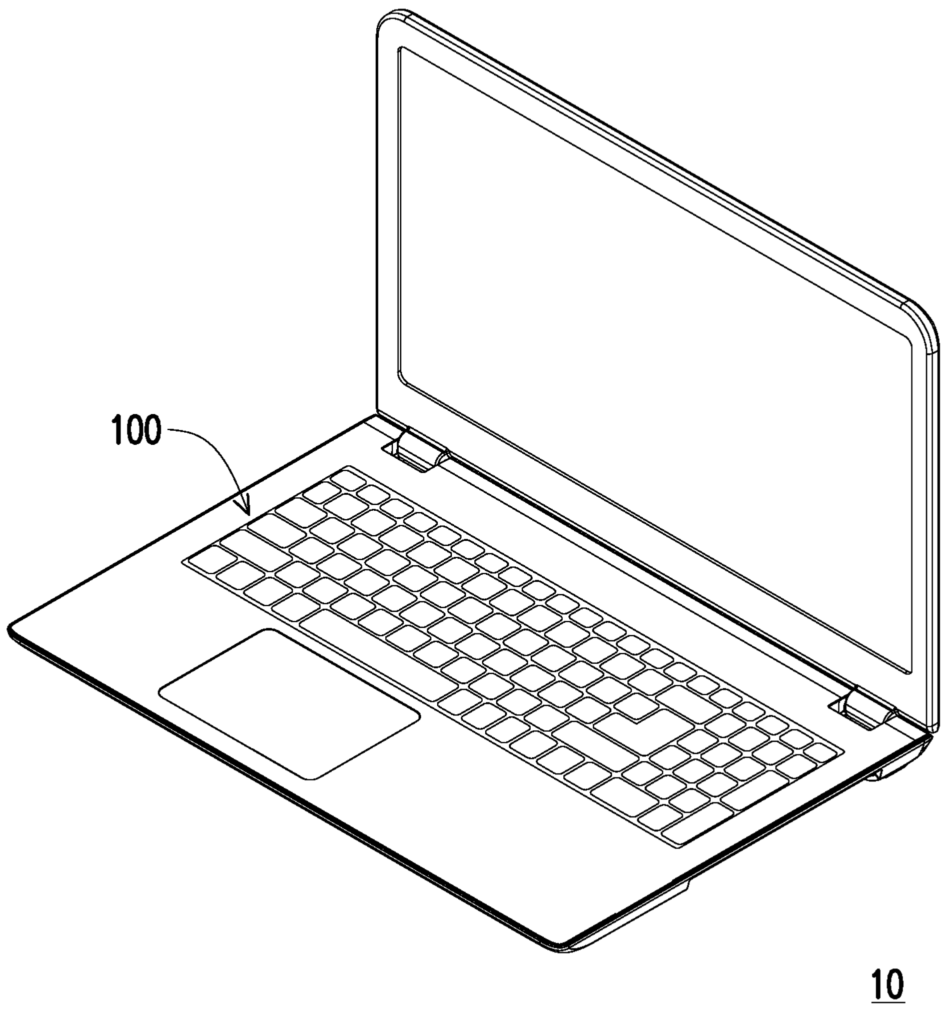
FIG. 1 is a schematic view of a keyboard device according to an embodiment of the disclosure.
Figure 2:
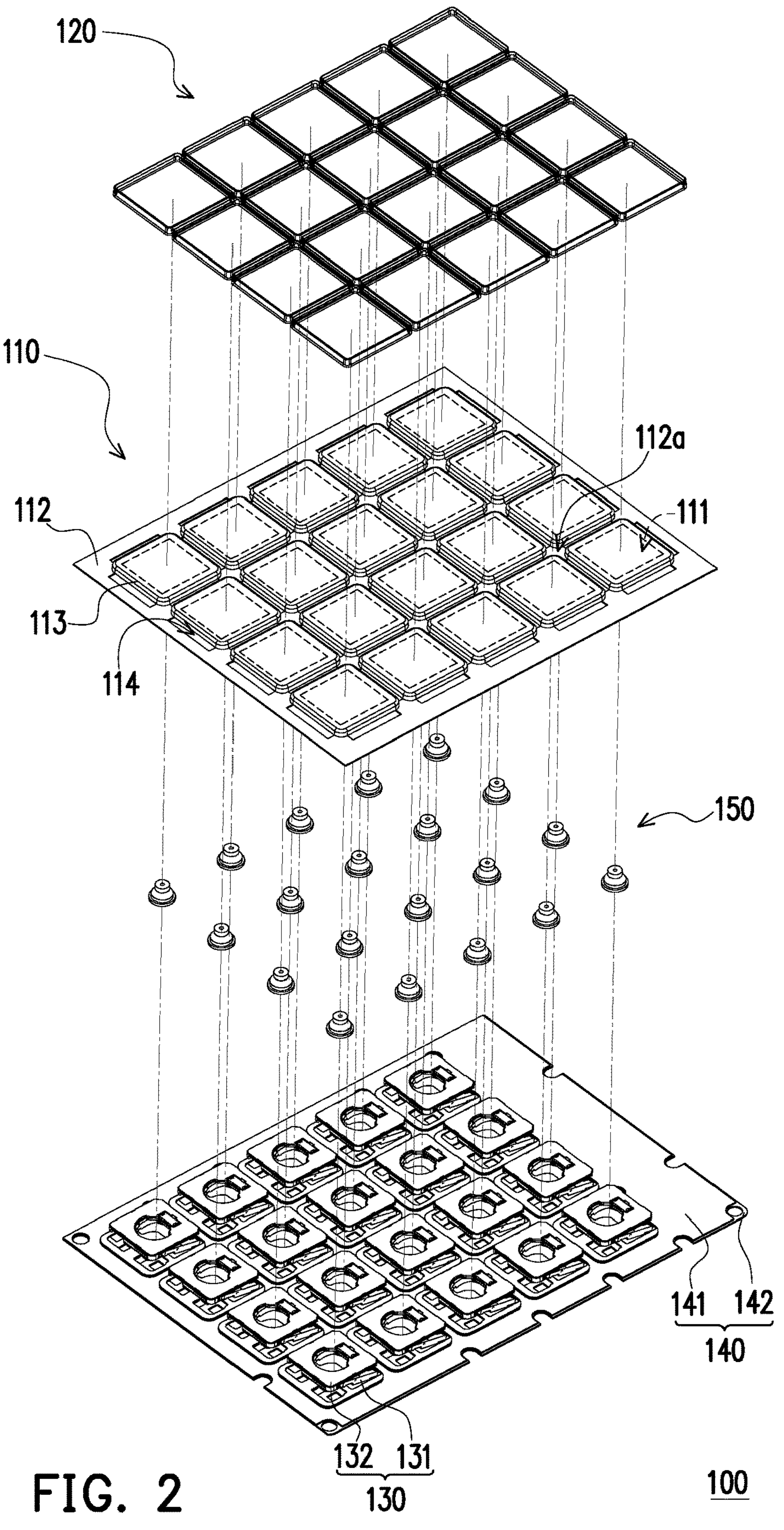
FIG. 2 is an exploded view of some components of the keyboard device of FIG. 1.

FIG. 1 is a schematic view of a keyboard device according to an embodiment of the disclosure. FIG. 2 is an exploded view of some components of the keyboard device of FIG. 1. Here, only a partial set of keys is shown as an example. Referring to both FIGS. 1 and 2, in this embodiment, a keyboard device 100 with a display panel is, for example, adapted to a notebook computer, but is not limited thereto. The keyboard device 100 includes a base 140, a scissors feet assembly 130, an elastic member 150, a display panel 110, and multiple light transmittance (transparent) keycaps 120. The scissors feet assembly 130 is movably disposed on the base 140. The elastic member 150 is disposed on the base 140. The display panel 110 is supported on the scissors feet assembly 130 and the elastic member 150. The display panel 110 has multiple hollow portions 114, multiple elastic portions 112*a*, and multiple display surfaces 111. Each of the display surfaces 111 is surrounded by the hollow portions 114, and each of the display surfaces 111 is suspended between the hollow portions 114 by the elastic portions 112*a*. The light transmittance keycaps 120 are disposed on the display panel 110, and respectively and correspondingly cover the display surfaces 111.

Figure 4:
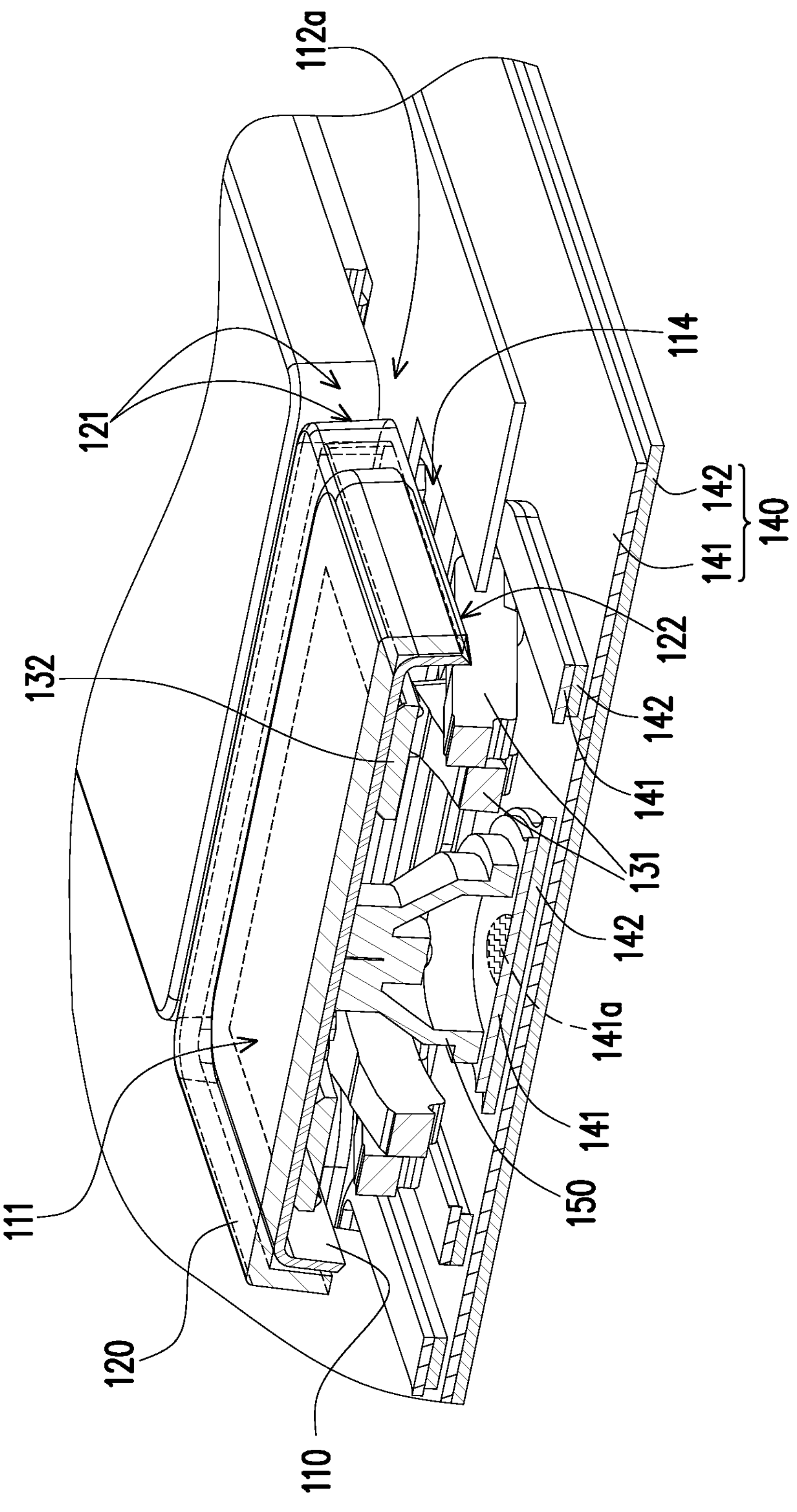
FIG. 4 is a partial cross-sectional view of the keyboard device of FIG. 1.

Furthermore, the base 140 of this embodiment includes a base plate 142 and a thin-film circuit 141, which are structurally interspersed with each other, so that the scissors feet assembly 130 on the base 140 is movably connected to the base plate 142, and the elastic member 150 is disposed on the thin-film circuit 141 to correspond to a trigger portion 141*a* of the thin-film circuit 141 (which is shown in FIG. 4 and illustrated in detail later). Here, the elastic member 150 is, for example, a rubber dome, or other elastic domes (such as a metal dome) or an elastic element suitable for elastic deformation during a pressing stroke, so as to facilitate supporting and resetting the display panel 110 and the light transmittance keycaps 120 thereon. The scissors feet assembly 130 includes a pair of brackets 131 respectively pivoted on the base plate 142 of the base 140 and pivotally connected to each other, and a top plate 132 pivotally connected to the pair of brackets 131 and supported by the pair of brackets 131. The display panel 110 has portions of the display surfaces 111 located between the top plate 132 and the light transmittance keycaps 120.

Figure 3:
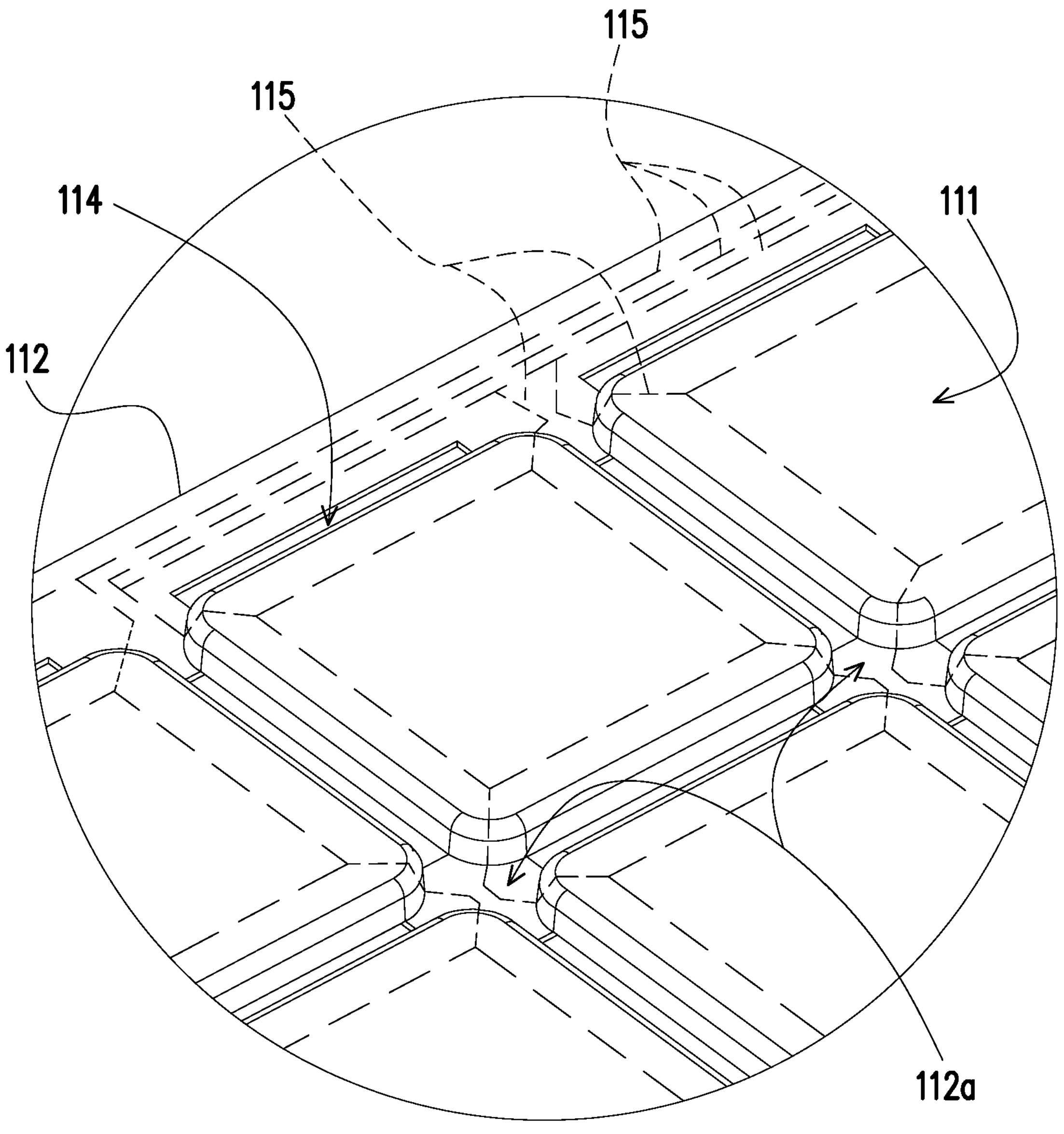
FIG. 3 shows a display panel of FIG. 2 from another perspective.

FIG. 3 shows a display panel of FIG. 2 from another perspective. For example, a bottom of the display panel 110 is shown from a side-to-bottom perspective. Referring to both FIGS. 2 and 3, in this embodiment, the display panel 110 has a base portion 112 and multiple plateau portions 113 that are raised relative to the base portion 112. The base portion 112 surrounds the plateau portions 113 arranged in an array. Each of the plateau portions 113 has the display surface 111, and each of the plateau portions 113 is connected to another on of the plateau portions 113 or the base portion 112 through the elastic portions 112*a*. Here, the display panel 110 is, for example, an electronic paper (E-paper) or a display module with electronic ink (E-ink), and uses a polymer composite material with flexibility, elasticity and ductility as a main external structure, such as PET (polyethylene terephthalate), so that in addition to severing as a basic structure for carrying and encapsulating the electronic ink or related display layer material, material properties thereof may further be used in this embodiment to facilitate a pressing process. For example, due to the material properties, the display panel 110 of this embodiment may form the plateau portions 113 with contours that conform to inner contours of the light transmittance keycaps 120, so that the display surface 111 may contact an inner top surface of the light transmittance keycap 120. This means that an image generated by the display surface 111 may be projected out of the keyboard device 100 through the light transmittance keycap 120 without obstacles.

FIG. 4 is a partial cross-sectional view of the keyboard device of FIG. 1. Referring to FIGS. 2, 3, and 4 together, in this embodiment, a corresponding relationship between the base 140, the scissors feet assembly 130, and the elastic member 150 may be clearly seen from FIG. 4. As shown in FIG. 2, the top plate 132 of the scissors feet assembly 130 has an opening to expose the elastic member 150 and allow the elastic member 150 to be abutted to a back of the display panel 110 through the opening. When the light transmittance keycap 120 is pressed, the brackets 131 are driven at the same time, and the elastic member 150 is elastically deformed. The elastic member 150 presses the trigger portion 141*a* with a conductive portion (not shown) thereof to generate an electrical conduction, so that the thin-film circuit 141 generates a command signal corresponding to the pressed light transmittance keycap 120. Once the light transmittance keycap 120 is no longer pressed, the elastic member 150 may drive the light transmittance keycap 120 to reset with an elastic force thereof, and move the conductive portion away from the trigger portion 141*a* to return to that shown in FIG. 4. It should be noted that, in order to improve the contrast and facilitate the identification, FIG. 4 shows the light transmittance keycap 120 only when the keyboard device 100 is sectioned, and the light transmitting feature of another adjacent light transmittance keycap 120 (which is not sectioned) is not shown.

Furthermore, the display panel 110 further has multiple connecting conductive lines 115, which are substantially disposed on the base portion 112 and the elastic portion 112*a*, extend to the display surface 111 located on the plateau portion 113, and are electrically connected between the display surfaces 111 through the elastic portion 112*a*. In other words, a portion of the display panel 110 that does not have the display surface 111 may be used as a structure for the connecting conductive lines 115 to carry and pass through.

In addition, referring to both FIGS. 2 and 4, in this embodiment, when the light transmittance keycap 120 is assembled to the display panel 110 to cover the display surface 111, multiple turning corners 121 of the light transmittance keycap 120 are respectively supported on the elastic portions 112*a*, and portions of multiple bottom side edges 122 of the light transmittance keycap 120 are respectively located on the hollow portions 114. Accordingly, due to the hollow portion 114, the light transmittance keycap 120 only presses the elastic portion 112*a* corresponding to the turning corner 121. As shown in FIG. 2 or FIG. 3, the four bottom side edges 122 of each of the light transmittance keycaps 120 correspond to the four hollow portions 114, and the four turning corners 121 correspond to the four elastic portions 112*a*. In the process of pressing the light transmittance keycap 120, for the display panel 110, it is equivalent to the display surface 111 being stretched and elastically deformed by the four elastic portions 112*a* to generate a height change relative to the base portion 112. After the applied force of pressing the light transmittance keycap 120 is removed, the display surface 111 returns to the state shown in FIG. 2 by an elastic force of the elastic portion 112*a*. In light of the above, in addition to the elastic member 150, the display panel 110 may also provide the same effect by the elastic portion 112*a* thereof. Accordingly, a designer may adjust an elastic coefficient of the two according to requirements, so as to provide the user with a better pressing sensation.

Figure 5:
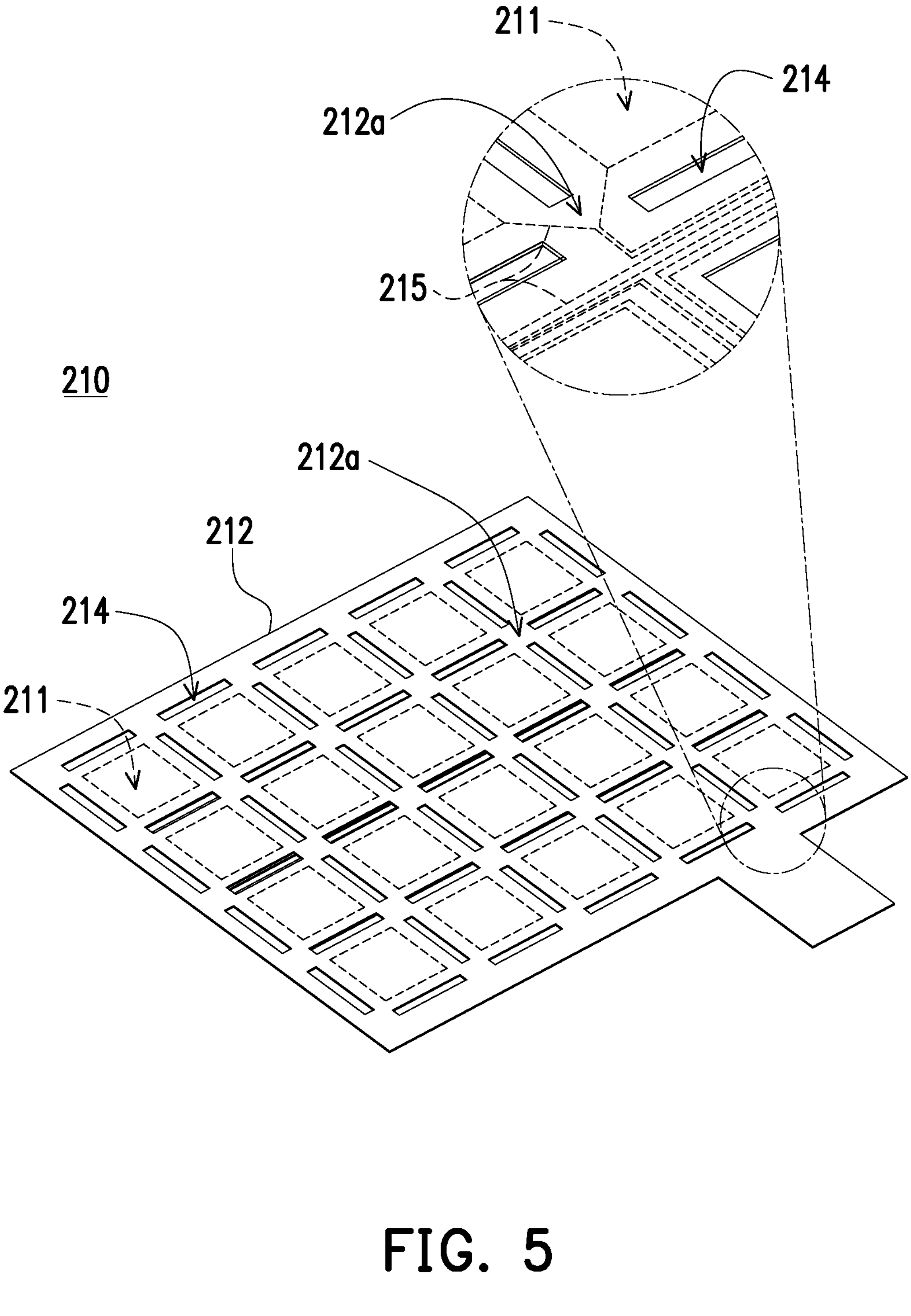
FIG. 5 is a schematic view of a display panel according to another embodiment of the disclosure.

FIG. 5 is a schematic view of a display panel according to another embodiment of the disclosure. Referring to FIG. 5 and compared with FIG. 2, the same as the previous embodiment, a display panel 210 also has multiple hollow portions 214, multiple elastic portions 212*a*, and multiple display surfaces 211. The difference is that a base 212 of this embodiment is coplanar with the display surface 211 and the elastic portion 212*a*. That is, the display panel 210 is a single-piece structure without height difference, which is equivalent to that the display panel 210 of this embodiment only needs to be punched to form the hollow portions 214 and the elastic portions 212*a*. In addition, similar to the previous embodiment, a connecting conductive line 215 may still be distributed on the base portion 212 and the elastic portion 212*a* to electrically connect the display surfaces 211, and at the same time, a right side protruding portion may be used to connect with other electronic elements. For example, in the notebook computer shown in FIG. 1, the keyboard device thereof may be electrically connected to a motherboard through the connecting conductive line 215 by the right side protruding portion shown in FIG. 5, so as to control the image to be displayed on the keyboard device, so that the user may redefine the images to be generated on the display surfaces 211 according to the use environment and requirements.

Based on the above, in the embodiments of the disclosure, the keyboard device with the display panel is provided with the display panel with the display surfaces, and the display panel is formed with the hollow portions, the elastic portions, and the display surfaces on the structure thereof. Each of the display surfaces is surrounded by the hollow portions, and each of the display surfaces is suspended between the hollow portions by the elastic portions. The light transmittance keycaps are respectively disposed on the display panel to cover the corresponding display surfaces. In this way, the image generated by the display panel is transmitted upwards and projected out of the keyboard through the light transmittance keycap to provide the user with the required and easily recognized text or pattern. Since the display panel is clamped between the light transmittance keycaps, the scissors feet assembly, and the elastic member, the generated image may be projected out of the keyboard device through the light transmittance keycap without obstacles.

At the same time, as mentioned above, each of the display surfaces is suspended between the hollow portions by the elastic portions. Therefore, when the light transmittance keycap of the keyboard device is pressed, the elastic portion is also be driven to elastically deform. That is, in addition to the elastic member, the elastic portion of the display panel may further provide functions other than display, so as to combine the elastic member to provide the required support and reset effect for the display panel and the light transmittance keycaps thereon, thereby enhancing the pressing sensation when the user presses the keyboard device.

In different embodiments, the display panel may be punched to form the hollow portions and the elastic portions due to the material properties of the main structure of the display panel. In addition to forming the hollow portions and the elastic portions, the plateau portions that are raised relative to the base portion are further generated by punching, and outer contours of the plateau portions may conform to the inner contours of the light transmittance keycaps, which is equivalent to contacting the display surfaces with the inner top surfaces of the light transmittance keycaps, so that the images of the display surfaces may be projected directly from the light transmittance keycap s.

What is claimed is:

1. A keyboard device with a display panel, comprising:

a base;

a scissors feet assembly disposed on the base;

an elastic member disposed on the base;

a display panel disposed on the scissors feet assembly and the elastic member, wherein the display panel has a base and a plurality of plateau portions, the plateau portions are raised from the base portion, arranged in an array, and independent from each other, each of the plurality of plateau portions has a display surface, and the display surface is supported on the scissors feet assembly and the elastic member; and a plurality of light transmittance keycaps disposed on the plurality of display surfaces respectively.

2. The keyboard device with the display panel according to claim 1, wherein the display panel has formability to form the plurality of plateau portions with contours that conform to inner contours of the plurality of light transmittance keycaps.

3. The keyboard device with the display panel according to claim 1, wherein the display panel further has a plurality of elastic portions, each of the plurality of plateau portions is connected to the base portion via at least one of the elastic portions.

4. The keyboard device with the display panel according to claim 3, wherein the display panel further has a plurality hollow portions, and each of the plurality of plateau portions is surrounded by the plurality of elastic portions and the plurality of hollow portions alternately.

5. The keyboard device with the display panel according to claim 3, wherein each of the plurality of plateau portions is connected to another one of the plurality of plateau portions or the base portion through at least one of the elastic portions.

6. The keyboard device with the display panel according to claim 1, wherein the display surface contacts an inner top surface of the light transmittance keycap.

7. The keyboard device with the display panel according to claim 3, wherein the plurality of elastic portions are coplanar with the plurality of display surfaces.

8. The keyboard device with the display panel according to claim 3, wherein the display panel has a plurality of connecting conductive lines electrically connected between the plurality of display surfaces through the plurality of elastic portions.

9. The keyboard device with the display panel according to claim 3, wherein a plurality of turning corners of each of the plurality of light transmittance keycaps are respectively supported on the plurality of elastic portions.

10. The keyboard device with the display panel according to claim 4, wherein portions of a plurality of bottom side edges of each of the plurality of light transmittance keycaps are respectively located on the plurality of hollow portions.

11. The keyboard device with the display panel according to claim 1, wherein the display panel is an electronic paper or a display module with electronic ink.

12. The keyboard device with the display panel according to claim 1, wherein the scissors feet assembly comprises a pair of brackets respectively pivoted on the base and pivotally connected to each other, and a top plate pivotally connected to the pair of brackets and supported by the pair of brackets, wherein each of the display surfaces is located between the top plate and the light transmittance keycap.

* * * * *